United States Patent [19]

Rocks

[11] 4,450,628

[45] May 29, 1984

[54] PRINTING PRESS BLANKET GAUGE

[76] Inventor: Joseph C. Rocks, 98 Adelaide St., West Ryde, N.S.W., Australia

[21] Appl. No.: 384,996

[22] Filed: Jun. 4, 1982

[51] Int. Cl.³ .............................................. G01B 5/06
[52] U.S. Cl. ................................. 33/172 E; 33/169 F; 73/150 R
[58] Field of Search ............ 33/169 B, 169 F, 172 E, 33/172 R; 73/150 R

[56] References Cited

U.S. PATENT DOCUMENTS

| 1,194,835 | 8/1916 | Gordon | 33/172 R |
| 1,927,821 | 9/1933 | Abbott | 33/172 R |
| 1,961,764 | 6/1934 | Horstkotte | 73/150 R |
| 3,462,848 | 8/1969 | Euverad | 33/169 F |
| 3,758,957 | 9/1973 | Eskijian | |

FOREIGN PATENT DOCUMENTS 817631  8/1959  United Kingdom .

Primary Examiner—William D. Martin, Jr.

Attorney, Agent, or Firm—Holman & Stern

[57] ABSTRACT

A printing press blanket gauge for measuring the thickness of blankets used in printing presses consisting of a casing containing measuring and indicating means such as a dial test indicator, the casing having projecting from it two pointed probe members capable of penetrating a printing blanket without damaging it and making electrical contact with a metal surface below the blanket, there being arranged between the pointed probe members a probing means connected to the dial test indicator and within the casing a source of electricity connected to the probe members through a lamp or other signalling means, the arrangement being such that when both the pointed probe members and the probing means are pressed against the surface of a printing blanket the pointed probe members pass through the blanket and are electrically connected externally of the casing through the metal surface beneath the blanket thus causing the lamp to illuminate and the dial test indicator to give a direct indication of the thickness of the blanket.

4 Claims, 4 Drawing Figures

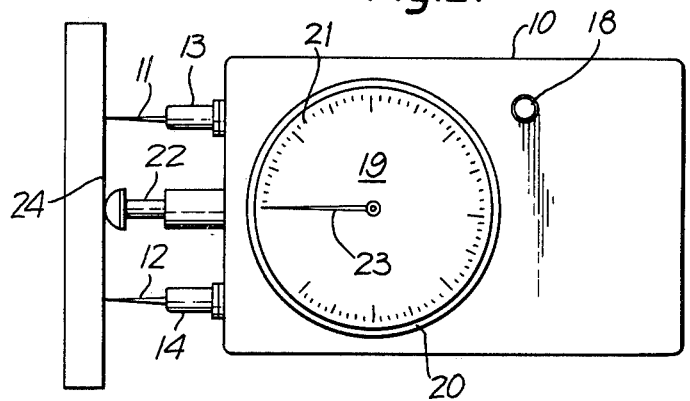
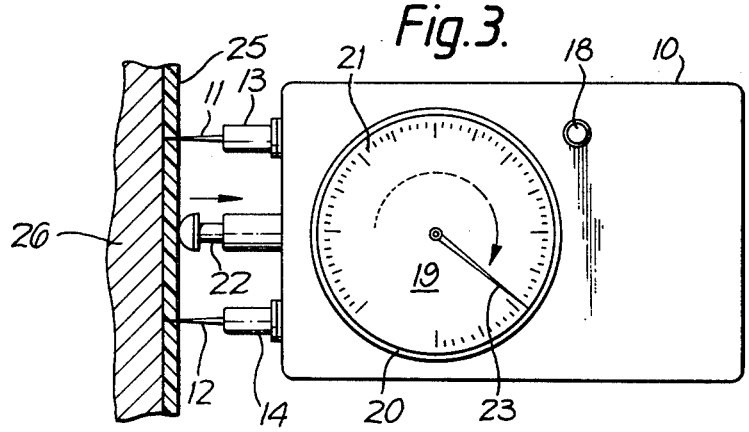
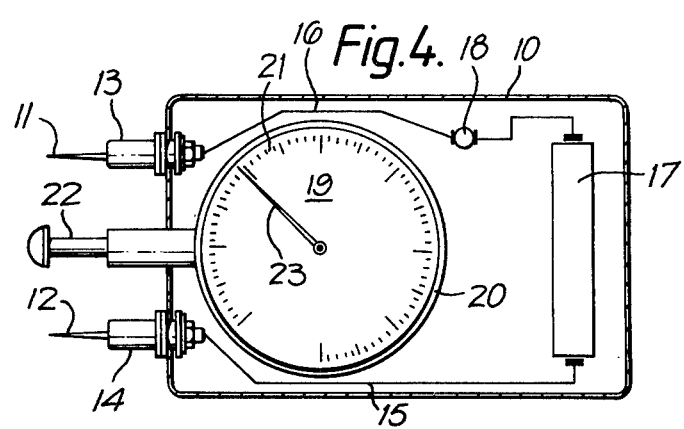

PRINTING PRESS BLANKET GAUGE

BACKGROUND OF THE INVENTION

1. Field of the Invention

The present invention relates to a printing press blanket gauge intended for use in making accurate measurements of the thickness of the blankets used in printing presses.

2. Description of the Prior Art

In both lithopress and offset printing use is made of what is known as a blanket which is usually in the form of a sheet of rubberized material which is stretched around a cylinder. For reasons well known to persons in the printing trade it is necessary that the thickness of blankets shall be maintained within very close limits, usually a few thousandths of an inch. If this is not done the operation of the press is upset to the extent that poor registration is obtained in color printing. This being the case it is necessary to check the thickness of blankets from time to time and the object of the present invention is to provide a relatively simple and inexpensive device whereby the thickness of a blanket may be readily checked at any point on its surface to a high degree of accuracy. Some existing devices used for checking blankets have the defect that they are capable of use only near the edges of the blanket, the central part of the blanket being inaccessible.

BRIEF SUMMARY OF THE INVENTION

The present invention consists in a printing press blanket gauge comprising a casing, a pair of pointed probe members projecting an equal distance from the casing, said pointed probe members being capable of penetrating a printing blanket without damage thereto and making electrical contact with a metal surface below the blanket, a probing means projecting at a position between said pointed probe members from said casing, said probing means being constructed to bear on the surface of a printing blanket without penetration and being movable in to and out of the casing, measuring and indicating means within the casing connected to said probing means, means whereby said measuring and indicating means can be set to zero when the projection from the casing of the said probing means is equal to the projection of said pointed probe members and a source of electricity in said casing connected to said probe members through visible or audible signalling means, the arrangement being such that when both said probing means and the pointed probe members are pressed against the surface of a printing blanket, both said pointed probe members pass through the blanket and are electrically connected externally of the casing through said metal surface, said signalling means is operated and said measuring and indicating means gives a direct indication of the thickness of the blanket.

BRIEF DESCRIPTION OF THE DRAWING

In order that the nature of the invention may be better understood a preferred form thereof is hereinafter described with reference to the accompanying diagrammatic drawings in which:

FIG. 2 is a top plan view of the gauge showing the manner in which the dial test indicator is calibrated, FIG. 3 is a top plan view showing the gauge in use and FIG. 4 is a top plan and partly cross-sectional view showing the arrangement of parts in the interior of the casing.

DETAILED DESCRIPTION

Figure 1:
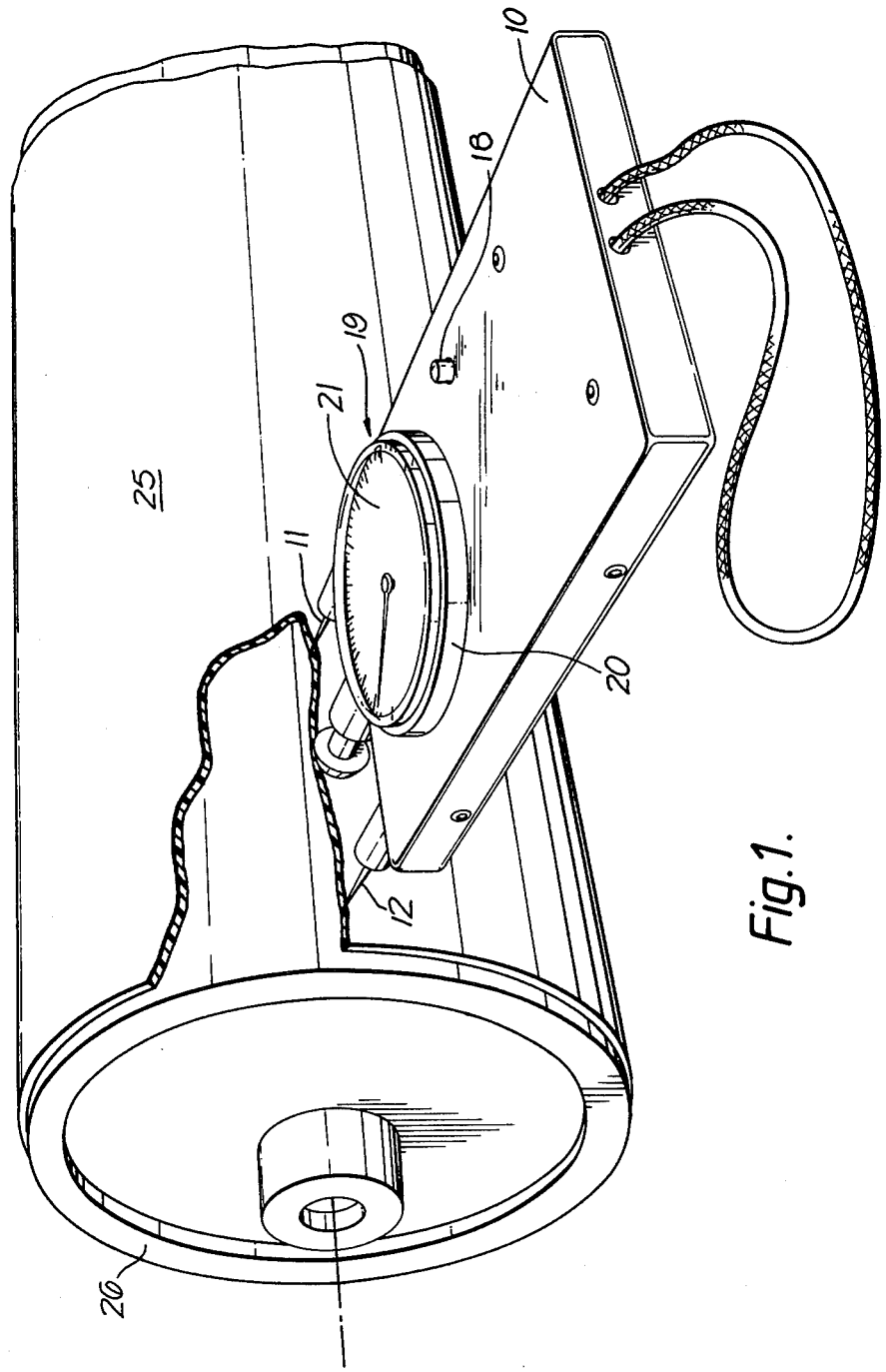
FIG. 1 is a perspective view showing a gauge according to the invention in use.

The gauge illustrated in the drawings consists of an outer casing 10 which may be of metal or plastic material and of any convenient shape. Projecting from one face of the casing 10 are two penetrating probes 11 and 12 each consisting of a fine needlepoint capable of penetrating a printing blanket while making a very small hole in it. The probes 11 and 12 are insulated from the casing by insulators 13 and 14 are connected electrically by conductive wires 15 and 16 to the opposite poles of a single cell dry battery 17. In the lead 16 is included a light emitting diode 18 which is set into the face of the casing 10 and thus visible externally.

Within the case 10 is a standard dial test indicator 19, the face of which is visible externally of the casing. The construction of the dial test indicator is substantially standard, it having a rotatable bezel 20, the rotation of which rotates the scale 21 of the gauge thereby enabling the reading to be set to zero. A plunger 22 projects from the gauge in the usual manner and movement of the plunger causes rotational movement of the indictor needle 23.

The apparatus is used by first placing the probes 11 and 12 in contact with a flat surface 24 (FIG. 2). This will have the effect of moving the plunger 22 into the casing until the extremities of the plunger 22 and the probes 11 and 12 are aligned. At this point the bezel 20 may be rotated to zero the instrument. If the instrument is now applied to the blanket 25 of a printing roller 26, taking care that the line joining the points of the probes 11 and 12 lies on a line parallel to the axis of the roller, the tips of the probes 11 and 12 will penetrate the blanket thereby making contact with the metal surface of the roller. The existence of such contact will be indicated by the lighting up of the light emitting diode 18. The end of the plunger 22 will rest on the surface of the blanket as shown in FIG. 3 and the needle 23 will indicate on the dial 21 directly the thickness of the blanket. Measurements may be made in this way quickly and easily at any point on the surface of the blanket.

The embodiment of the invention described above is given by way of example only and as will be readily appreciated by those skilled in the art a variety of different forms of device may be constructed within the general scope of the invention as defined broadly above.

I claim:

1. A printing press blanket gauge comprising a casing, a pair of pointed probe members projecting an equal distance from the casing and being shaped to penetrate a printing blanket without damage thereto and make electrical contact with a metal surface underneath the blanket, a probing means projecting from said casing at a position between said pointed probe members and being constructed to bear on the outer surface of said printing blanket without penetration and being movable into and out of the casing, measuring and indicating means within the casing operatively connected to said probing means to be actuated thereby, means to set said measuring and indicating means to zero when the projection from the casing of said probing means is equal to the projection of said pointed probe members, and a source of electricity in said casing operatively connected to said probe members through visible or audible signalling means, the arrangement being such that when both said probing means and pointed probe members are pressed against the surface of a printing blanket said pointed probe members pass through the blanket and are electrically connected externally of the casing through said metal surface, said probing means is displaced with respect to said casing to actuate said signalling means and said measuring and indicating means gives a direct indication of the thickness of the blanket.

2. A printing press blanket gauge as claimed in claim 1 wherein said signalling means comprises a light emitting diode and said source of electricity is a battery contained within the casing.

3. A printing press blanket gauge as claimed in either of the preceding claims wherein said measuring and indicating means comprises a dial test indicator having a plunger, and said probing means comprises said plunger.

4. A printing press blanket gauge as claimed in claim 3 wherein said probe members comprise needle shaped members, and further comprising insulating support members mounted in said casing, said needle shaped probe members being mounted in said insulating members.

* * * * *